UNITED STATES PATENT OFFICE

2,592,105
IODINATED AMINOPHENYLSULFONYL-AMINO CARBOXYLIC ACIDS

Sydney Archer, Albany, N. Y., assignor to Sterling Drug Inc., New York, N. Y., a corporation of Delaware No Drawing. Application November 16, 1948, Serial No. 60,402

10 Claims. (Cl. 260—397.7)

This invention relates to iodinated aminophenylsulfonyl-amino carboxylic acids and to salts thereof. These compounds are opaque to X-rays and are valuable as contrast media in roentgenological examinations of body cavities and particularly of the gall bladder.

My new compounds have the formula

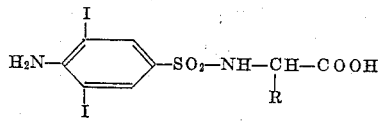

wherein R is a hydrocarbon group of 2–7 carbon atoms. The salts of these acids, particularly those which are water-soluble, formed from therapeutically acceptable inorganic or organic bases, are also within the scope of the invention. Such therapeutically acceptable bases are those which do not of themselves, when in the form of cations, cause deleterious effects on the organism at dosage levels of the magnitude used for roentgenological visualization. Examples of such bases include sodium hydroxide, potassium hydroxide, ammonium hydroxide, methyl amine, dimethylamine, triethylamine, ethanolamine, diethanolamine, triethanolamine, ethanol-diethylamine, etc.

Those compounds in which the radical R has about 2–7 carbon atoms are gall bladder contrast agents, those where R contains 5–6 carbon atoms being most effective. If R contains fewer than 2 carbon atoms, an increasing tendency to pass through the kidneys is observed, so that the lower homologues of this series of compounds are uographic rather than cholecystographic agents. On the other hand the presence of a large number of carbon atoms decreases absorption to such an extent that the compounds are largely eliminated through the gut.

The gall bladder contrast agents which have been widely used up to the present time are not completely satisfactory. Some are too toxic and others occasionally produce pain on urination, interfere with the rate of emptying of the gall bladder following a fatty meal, cause a burning sensation in the throat, or produce nausea, vomiting and diarrhea.

My compounds may be prepared in the following manner. N-acetylaminobenzenesulfonyl chloride (N-acetylsulfanilyl chloride) is condensed in the presence of alkali (Schotten-Baumann method) with an alpha amino acid to give an N-(p-acetylaminobenzenesulfonyl)-amino acid. Acid hydrolysis of this product removes the acetyl group giving a sulfanilyl-amino acid. The latter can be iodinated readily with elementary iodine or, preferably, with iodine monochloride in acetic or hydrochloric acid solution. The iodine enters the two positions ortho to the nuclear amino group.

An alternative method involves as a starting material p-nitrobenzenesulfonyl chloride. This is used to acylate an alpha amino acid giving an N-(p-nitrobenzenesulfonyl)-amino acid. Reduction of the nitro group to amino, catalytically or by chemical methods, produces a sulfanilylamino acid, and iodination is the same as before.

Any alpha amino acid which is monobasic, has a single amino group, and in which the remainder of the molecule is strictly hydrocarbon in character and has the prescribed carbon content (3–8 carbon atoms exclusive of the carboxyl group), may be used. This includes many natural occurring amino acids such as valine, norvaline, leucine, norleucine, isoleucine, phenylalanine, and alpha-aminobutyric acid. In addition, alpha amino acids prepared by synthesis may be used.

The folowing examples will further illustrate my invention and demonstrate the generality of the reactions involved, without, however, limiting the scope of the invention thereto.

Example 1

(a). *alpha - (p - Acetamidobenzenesulfonamido)-beta-phenylpropionic acid.*—To a solution of 5 g. of sodium hydroxide in 100 cc. of water there was added, with stirring, 9.9 g. of dl-phenylalanine. When the amino acid had dissolved there was then added portionwise and with vigorous stirring 14 g. of p-acetamidobenzenesulfonyl chloride. Stirring was continued for one hour. The mixture was then filtered and the filtrate acidified. Upon recrystallization from dilute alcohol there was obtained 12 g. of pure alpha-(p-acetamidobenzenesulfonamido)-beta-phenylpropionic acid, M. P. 218–219° C. (uncorr.) Anal. Calcd. for $C_{13}H_{18}O_5N_2S$: S, 10.10; found: S, 10.25.

(b). *alpha - Sulfanilamido - beta-phenylpropionic acid.*—A mixture of 29.0 g. of alpha-(p-acetamidobenzenesulfonamido)-beta-phenyl-propionic acid, 8 cc. of concentrated hydrochloric acid and 18 cc. of water was refluxed for 40 minutes. At the end of this time a completely clear solution resulted. Enough 10% potassium hydroxide solution to neutralize all the hydrochloric acid was added and the solution cooled.

The desired product which separated was collected on a filter and recrystallized from dilute ethanol. There was obtained 21 g., M. P. 198.5–199° C. (uncorr.), of alpha-sulfanilamido-beta-phenylpropionic acid, as pure white needles.

Anal. Calcd. for $C_{15}H_{16}N_2O_4S$: N, 8.75; found: N, 8.54.

(c). *alpha-(4-amino - 3,5 - diiodobenzenesulfonamido)-beta-phenylpropionic acid.*—A mixture of 23.4 g. of alpha-sulfanilamido-beta-phenylpropionic acid, 50 cc. of water and 150 cc. of acetic acid was warmed to 80° C. with stirring. To the resulting clear solution a mixture of 7.8 cc. of iodine monochloride and 7.8 cc. of acetic acid was added in one portion. Stirring was continued for one hour and then water was added to the point of turbidity. After standing for several hours a precipitate of the desired iodo compound was formed. It was collected on a filter and recrystallized from acetic acid, giving about 28.7 g. of alpha-(4-amino-3,5-diiodobenzenesulfonamido)-beta-phenylpropionic acid, M. P. 197.5–199.5° C. (corr.).

Anal. Calcd. for $C_{15}H_{14}O_4N_2SI_2$: S, 5.60; I, 44.33; found: S, 5.70; I, 44.85.

Example 2

(a). *alpha - Aminocyclopentaneacetic acid.*—Sodium ethoxide was prepared from 34.5 g. of sodium and 750 cc. of absolute ethanol. To this solution was added 255 g. of ethyl acetamidocyanoacetate followed by 225 g. of cyclopentyl bromide added dropwise with stirring. After refluxing the mixture for seventeen hours, it was poured into ice-water, and the crude substituted ester was extracted with ether. The residue left after evaporation of the ether was saponified by refluxing with a solution of 350 g. of sodium hydroxide in 3500 cc. of water for a period of about sixteen hours. The solution was then cooled, brought to neutrality by the addition of hydrochloric acid and made distinctly acid with acetic acid, whereupon the amino acid precipitated and was filtered. The crude product was recrystallized by dissolving it in a minimum amount of dilute hydrochloric acid, clarifying the solution with activated charcoal, and adding pyridine gradually until precipitation of the amino acid was complete. In this way 95 g. of alpha-aminocyclopentaneacetic acid was obtained with a melting point greater than 220° C.

(b). *alpha -(p - Acetamidobenzenesulfonamido)-cyclopentaneacetic acid* was prepared from alpha-aminocyclopentaneacetic acid and p-acetamidobenzenesulfonyl chloride by the method described in Example 1, part (a). The product was recrystallized from dilute ethanol and melted at 238–240° C. (uncorr.).

(c). *alpha-(4-amino - 3,5 - diiodobenzenesulfonamido)-cyclopentaneacetic acid.*—alpha-(p - Acetamidobenzenesulfonamido)- cyclopentane - acetic acid was hydrolyzed with hydrochloric acid by the method described in Example 1, part (b). The crude amino acid was not purified but was iodinated directly by the method of Example 1, part (c) to give alpha-(4-amino-3,5-diiodobenzenesulfonamido)- cyclopentaneacetic acid, which, when recrystallized from dilute methanol had the M. P. 216–217.5° C. (corr.).

In the following tables are listed the structures, analyses, melting points and solvents used in recrystallization of several compounds of my invention and their intermediates. They were all prepared by the processes described in the previous examples using the appropriate amino acid as starting material.

TABLE I

*N-acetylsulfanilamidocarboxylic acids*

| Compound | R | M. P. °C. (uncorr.) | Solvent |
|---|---|---|---|
| 1 | $C_6H_5CH_2$— | 218–219 | $C_2H_5OH$—$H_2O$. |
| 2 | (cyclopentyl) | 238–240 | $C_2H_5OH$—$H_2O$. |
| 3 | $CH_3CH_2CH_2CH_2CH_2$— | 168–170 | $C_2H_5OH$—$H_2O$. |
| 4 | $CH_3CH_2CH_2CH_2$— | 190–191 | $C_2H_5OH$—$H_2O$. |
| 5 | $(CH_3)_2CH$— | 210–211 | $C_2H_5OH$—$H_2O$. |
| 6 | $CH_3CH_2CH$—<br>    $\vert$<br>   $CH_3$ | 189–190 | $C_2H_5OH$—$H_2O$. |
| 7 | $C_6H_5$— | 224–226 | $C_2H_5OH$—$H_2O$. |
| 8 | $(CH_3)_2CHCH_2$— | 211–212 | $C_2H_5OH$—$H_2O$. |
| 9 | $(CH_3)_2CHCH_2CH_2$— | 181–184 | $C_2H_5OH$—$H_2O$. |
| 10 | $CH_3CH_2$— | 190–191 | $C_2H_5OH$—$H_2O$. |

Analyses

| | Formula | Calcd. | Found |
|---|---|---|---|
| 1 | $C_{17}H_{18}O_5N_2S$ | S, 8.84 | S, 9.07 |
| 2 | $C_{15}H_{20}O_5N_2S$ | S, 9.41 | S, 9.55 |
| 3 | $C_{15}H_{22}O_5N_2S$ | S, 9.36 | S, 9.46 |
| 4 | $C_{14}H_{20}O_5N_2S$ | S, 9.76 | S, 9.82 |
| 5 | $C_{13}H_{18}O_5N_2S$ | S, 10.10 | S, 10.25 |
| 6 | $C_{14}H_{20}O_5N_2S$ | S, 9.76 | S, 9.33 |
| 7 | $C_{16}H_{16}O_5N_2S$ | S, 9.20 | S, 9.23 |
| 8 | $C_{14}H_{20}O_5N_2S$ | N, 8.53 | N, 8.29 |
| 9 | $C_{15}H_{22}O_5N_2S$ | S, 9.42 | S, 9.56 |
| 10 | $C_{12}H_{16}O_5N_2S$ | S, 10.68 | S, 10.88 |

TABLE II

*Sulfanilamidocarboxylic acids*

| Compound | R | M. P. °C. | Solvent |
|---|---|---|---|
| 1 | $C_6H_5CH_2$— | 198.5–199 (uncorr.) | $C_2H_5OH$—$H_2O$. |
| 2 | (cyclopentyl) | | |
| 3 | $CH_3CH_2CH_2CH_2CH_2$— | | |
| 4 | $CH_3CH_2CH_2CH_2$— | 158–160 (uncorr.) | $H_2O$. |
| 5 | $(CH_3)_2CH$— | 189–190 (corr.) | $H_2O$. |
| 6 | $CH_3CH_2CH$—<br>   $\vert$<br>   $CH_3$ | 172–173 (corr.) | $H_2O$. |
| 7 | $C_6H_5$— | 202–204 (corr.) | $C_2H_5OH$—$H_2O$. |
| 8 | $(CH_3)_2CHCH_2$— | 222–225 (uncorr.) | $H_2O$. |
| 9 | $(CH_3)_2CHCH_2CH_2$— | 149–150 (uncorr.) | $C_2H_5OH$—$H_2O$. |
| 10 | $CH_3CH_2$— | 195–196 (corr.) | $H_2O$. |

Analyses

| | Formula | Calcd. | Found |
|---|---|---|---|
| 1 | $C_{15}H_{16}O_4N_2S$ | N, 8.75 | N, 8.54 |
| 2 | | | |
| 3 | | | |
| 4 | $C_{12}H_{18}O_4N_2S$ | [1] N, 4.89 | [1] N, 4.70 |
| 5 | $C_{11}H_{16}O_4N_2S$ | S, 11.77 | S, 11.73 |
| 6 | $C_{12}H_{18}O_4N_2S$ | S, 11.20 | S, 11.15 |
| 7 | $C_{14}H_{14}O_4N_2S$ | S, 10.47 | S, 10.61 |
| 8 | $C_{12}H_{18}O_4N_2S$ | [1] N, 4.89 | [1] N, 4.02 |
| 9 | $C_{13}H_{20}O_4N_2S$ | S, 10.07 | S, 10.87 |
| 10 | $C_{10}H_{14}O_4N_2S$ | S, 12.41 | S, 12.51 |

[1] N—by perchloric acid titration.

TABLE III

*4 - amino - 3.5 - diiodosulfanilamidocarboxylic acids*

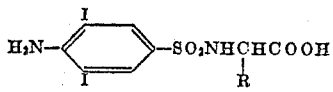

| Compound | R | M. P. °C. (corr.) | Solvent |
|---|---|---|---|
| 1 | C₆H₅CH₂— | 197.5–199.5 | CH₃COOH. |
| 2 | (cyclopentyl) | 216–217.5 | CH₃OH–H₂O. |
| 3 | CH₃CH₂CH₂CH₂CH₂— | 176–178 | C₆H₆—petroleum ether. |
| 4 | CH₃CH₂CH₂CH₂— | 173–174 | CH₃COOH–H₂O. |
| 5 | (CH₃)₂CH— | 179–181.5 | CH₃COOC₂H₅—petroleum ether. |
| 6 | CH₃CH₂CH—<br>       CH₃ | 169.5–170.5 | CH₃COOH–H₂O. |
| 7 | C₆H₅— | 219.5–220 | CH₃COOH–H₂O. |
| 8 | (CH₃)₂CHCH₂— | 208.5–210.5 | CH₃OH–H₂O. |
| 9 | (CH₃)₂CHCH₂CH₂— | 194–195 | C₂H₅OH–H₂O. |
| 10 | C₂H₅— | 185.5–187 | C₂H₅OH–H₂O. |

*Analyses*

| | Formula | Calcd. | | Found | |
|---|---|---|---|---|---|
| | | S | I | S | I |
| 1 | C₁₅H₁₄O₄N₂SI₂ | 5.60 | 44.33 | 5.70 | 44.85 |
| 2 | C₁₃H₁₆O₄N₂SI₂ | 5.83 | 46.14 | 5.96 | 46.39 |
| 3 | C₁₃H₁₈O₄N₂SI₂ | 5.80 | 45.98 | 5.95 | 45.50 |
| 4 | C₁₂H₁₆O₄N₂SI₂ | 5.96 | 47.17 | 6.06 | 47.11 |
| 5 | C₁₁H₁₄O₄N₂SI₂ | 6.11 | 48.46 | 6.27 | 48.00 |
| 6 | C₁₂H₁₆O₄N₂SI₂ | 5.96 | 47.17 | 6.10 | 46.60 |
| 7 | C₁₄H₁₂O₄N₂SI₂ | 5.74 | 45.47 | 5.83 | 45.10 |
| 8 | C₁₂H₁₆O₄N₂SI₂ | 5.96 | 47.17 | 5.86 | 46.85 |
| 9 | C₁₃H₁₈O₄N₂SI₂ | 5.81 | 45.97 | 5.89 | 46.00 |
| 10 | C₁₀H₁₂O₄N₂SI₂ | 6.29 | 49.77 | 6.22 | 49.80 |

I claim:

1. A member of the group consisting of a compound having the formula

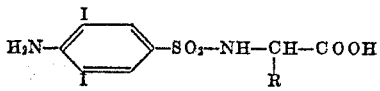

wherein R is a hydrocarbon group of from 2 to 7 carbon atoms selected from the group consisting of alkyl, aralkyl, aryl and cycloalkyl groups; and water-soluble, non-toxic salts thereof.

2. A compound having the formula

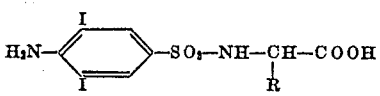

wherein R is an alkyl group of 2 to 7 carbon atoms.

3. A compound having the formula

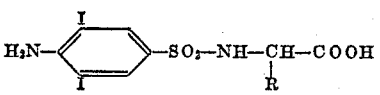

wherein R is a cycloalkyl group of 5 to 6 carbon atoms.

4. 2 - (3,5 - diiodo - 4 - aminobenzenesulfonamido)-heptanoic acid having the formula

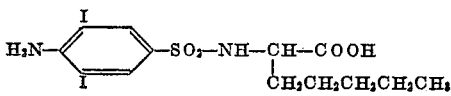

5. 2 - (3,5 - diiodo - 4 - aminobenzenesulfonamido)-hexanoic acid having the formula

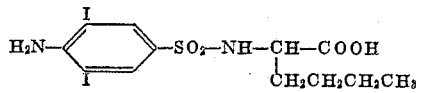

6. 2 - (3,5-diiodo - 4 - aminobenzenesulfonamido)-4-methylpentanoic acid having the formula

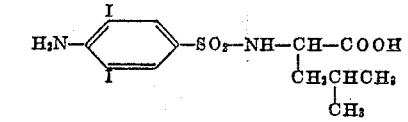

7. 2 - (3,5 - diiodo - 4 - aminobenzenesulfonamido)-5-methylhexanoic acid having the formula

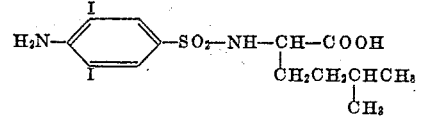

8. Alpha - (3,5 - diiodo - 4 - aminobenzenesulfonamido)-cyclopentane-acetic acid having the formula

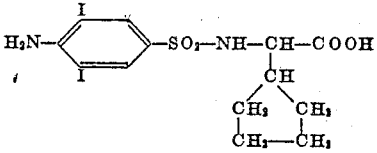

9. The process of preparing a compound of the formula

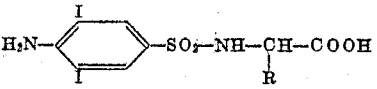

wherein R is a hydrocarbon group of from 2 to 7 carbon atoms selected from the group consisting of alkyl, aralkyl, aryl and cycloalkyl groups which comprises iodinating in the 3- and 5-positions a compound of the formula

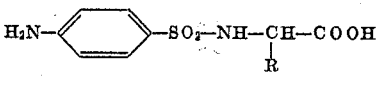

by heating with an excess of an iodinating agent selected from the group consisting of elementary iodine and iodine monochloride.

10. The process of claim 9 in which the iodinating agent is iodine monochloride in an acid medium.

SYDNEY ARCHER.

REFERENCES CITED

The following references are of record in the file of this patent:

UNITED STATES PATENTS

| Number | Name | Date |
|---|---|---|
| 2,142,847 | Hultquist | Jan. 3, 1939 |
| 2,400,433 | Natelson et al. | May 14, 1946 |

OTHER REFERENCES

Klemme et al., "J. Org. Chem.," vol. 8 (1943), pp. 448 to 455.

Mazza et al., "Atti Peale Accord. Maz. Lincei.," vol. 28, February 1938, pp. 154 to 156.